United States Patent
Kuroda et al.

(10) Patent No.: US 10,072,189 B2
(45) Date of Patent: Sep. 11, 2018

(54) SILICONE ADHESIVE COMPOSITION, A METHOD FOR THE PREPARATION THEREOF AND AN ADHESIVE FILM

(71) Applicant: Shin-Etsu Chemical Co., Ltd., Tokyo (JP)

(72) Inventors: Yasuyoshi Kuroda, Annaka (JP); Yuta Kobayashi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 115 days.

(21) Appl. No.: 14/670,615

(22) Filed: Mar. 27, 2015

(65) Prior Publication Data

US 2015/0275060 A1 Oct. 1, 2015

(30) Foreign Application Priority Data

Mar. 28, 2014 (JP) ................................. 2014-070148
Feb. 27, 2015 (JP) ................................. 2015-038737

(51) Int. Cl.
| | |
|---|---|
| *C09J 183/04* | (2006.01) |
| *C08G 77/34* | (2006.01) |
| *C09J 183/14* | (2006.01) |
| *C08L 83/04* | (2006.01) |
| *C09J 7/28* | (2018.01) |
| *C08G 77/12* | (2006.01) |
| *C08G 77/20* | (2006.01) |

(52) U.S. Cl.
CPC ............ *C09J 183/04* (2013.01); *C08G 77/34* (2013.01); *C08L 83/04* (2013.01); *C09J 7/28* (2018.01); *C09J 183/14* (2013.01); *C08G 77/12* (2013.01); *C08G 77/20* (2013.01); *Y10T 428/2852* (2015.01)

(58) Field of Classification Search
CPC ...... C08J 183/04; C09J 183/04; C09J 183/08; C09J 183/14; C08G 77/34; C08G 77/20; C08L 83/08; C08L 83/04
See application file for complete search history.

(56) References Cited

U.S. PATENT DOCUMENTS

| | | | | |
|---|---|---|---|---|
| 5,145,931 A | * | 9/1992 | Nakayoshi ............. | C08G 77/34 524/783 |
| 5,173,765 A | * | 12/1992 | Nakayoshi ........ | H01L 23/49513 257/666 |
| 2002/0136872 A1 | | 9/2002 | Furuta et al. | |
| 2006/0094834 A1 | * | 5/2006 | Aoki ...................... | C09J 7/0207 525/478 |
| 2011/0111217 A1 | * | 5/2011 | Kuroda .................. | C09J 7/0207 428/339 |

(Continued)

FOREIGN PATENT DOCUMENTS

| | | |
|---|---|---|
| EP | 2 031 444 A2 | 3/2009 |
| JP | 2001-345415 A | 12/2001 |

(Continued)

OTHER PUBLICATIONS

Extended European Search Report dated Nov. 3, 2015, in European Patent Application No. 15161321.3.

*Primary Examiner* — Sanza Mcclendon
(74) *Attorney, Agent, or Firm* — Birch, Stewart, Kolasch & Birch, LLP

(57) ABSTRACT

One of the purposes of the present invention is to provide an silicone adhesive composition which comprises no antioxidant, has sufficient adhesive, tack properties and excellent heat resistance, and provides a silicone adhesive composition which has no adhesive residue in a test described below. The other purpose of the present invention is to provide an adhesive film and an adhesive tape having a cured layer obtained from the composition. The present invention provides an addition curable or peroxide curable silicone adhesive composition, wherein the addition curable silicone adhesive composition comprises
 (A1) a diorganopolysiloxane having an alkenyl group and a viscosity at 25 degrees C. of 100,000 mPa·s or more,
 (B) an organopolysiloxane having $R^1_3SiO_{0.5}$ units and $SiO_2$ units, wherein $R^1$ is a substituted or unsubstituted, monovalent hydrocarbon group having 1 to 10 carbon atoms,
 (C) an organchydrogenpolysiloxane having at least three SiH groups,
 (D) optionally an addition reaction inhibitor,
 (E) a platinum group metal catalyst for an addition reaction, and
 (F) an organic solvent, and the peroxide curable silicone adhesive composition comprises
 (A2) a diorganopolysiloxane having a viscosity at 25 degrees C. of 100,000 mPa·s or more and may or may not have an alkenyl group,
 (B) an organopolysiloxane having $R^1_3SiO_{0.5}$ units and $SiO_2$ units, wherein $R^1$ is a substituted or unsubstituted, monovalent hydrocarbon group having 1 to 10 carbon atom,
 (F) an organic solvent, and
 (G) an organic peroxide, and components (A1) and (A2) may be accompanied with octamethylcyclotetrasiloxane and/or decamethylcyclopentasiloxane and each content of octamethylcyclotetrasiloxane and decamethylcyclopentasiloxane is less than 0.1 mass %, based on a total amount of component (A1) or (A2), component (B) and octamethylcyclotetrasiloxane and decamethylcyclopentasiloxane.

6 Claims, No Drawings

(56) References Cited

U.S. PATENT DOCUMENTS

2012/0172543 A1   7/2012   Cray et al.

FOREIGN PATENT DOCUMENTS

| JP | 2004-168808 A | 6/2004 |
| JP | 2006-28311 A | 2/2006 |
| JP | 2014-47310 A | 2/2006 |
| JP | 2006-206890 A | 8/2006 |
| JP | 2013-503248 A | 1/2013 |

* cited by examiner

SILICONE ADHESIVE COMPOSITION, A METHOD FOR THE PREPARATION THEREOF AND AN ADHESIVE FILM

CROSS REFERENCE

This application claims the benefits of Japanese Patent application Nos. 2014-070148 filed on Mar. 28, 2014, and 2015-038737 filed on Feb. 27, 2015, the contents of which are hereby incorporated by reference.

FIELD OF TEE INVENTION

The present invention relates to an adhesive composition, a method for the preparation thereof, an adhesive film and an adhesive tape. When precision parts, optical parts, and electronic parts are processed by heating at 260 degrees C. or higher for a long time, the adhesive film and the adhesive tape are preferably used to protect or mask these parts.

BACKGROUND OF THE INVENTION

A silicone adhesive layer has excellent heat resistance, cold resistance, weather resistance, electrical insulating properties and chemical resistance. Therefore, adhesive tapes and adhesive labels having a silicone adhesive layer are used under severe environments in which quality of the other adhesive agents such as an acryl type adhesive agent, an elastomer type adhesive agent, an urethane type adhesive agent and an epoxy type adhesive agent deteriorates.

One of the severe environments is a high temperature of 250 degrees C. or higher. For instance, this environment is used for masking or temporarily fixing semiconductor parts in a reflow process or an encapsulating process with a resin of the semiconductor parts. In recent years, semiconductor parts are heated and treated at a higher temperature and, therefore, it is needed to increase heat resistance of the silicone adhesive agent.

A lead-free solder alloy has been used in a reflow process for molding electronic parts. For instance, a reflow temperature in the recent manners is higher than that in the conventional manners and a peak temperature reaches sometimes to 280 degrees C. in a reflow oven. It is needed that an adhesive agent does not peel from a substrate during the reflow soldering and an adhesive tape is released from the substrate without remaining any stain on the substrate after the reflow soldering. In recent years, the reflow process sometimes needs a higher temperature such as 300 degrees C.

However, when an adhesive tape with a conventional silicone adhesive agent is released from a substrate after exposed to a temperature of 200 to 250 degrees C., the adhesive agent remains sometimes partly or wholly on the substrate. In the present specification, this is referred to as "adhesive residue".

Japanese Patent No. 4619486 describes that an antioxidant is added in a siloxane binder for an adhesive tape in order to prevent the adhesive residue.

Japanese Patent No. 4180353 describes that a phenol antioxidant is added in an addition-curable adhesive siloxane composition. An adhesive tape having the adhesive siloxane composition is applied on a metal substrate such as copper one and released from the substrate with no adhesive residue, even after heated at 150 to 250 degrees C.

However, when this silicone adhesive agent is exposed to a higher temperature such as 270 degrees C. or higher, the antioxidant deteriorates and the effect of preventing adhesive residue is not obtained. Further, when a substrate is made of a metal such as copper, copper alloy and iron, the surface of the metal is oxidized to thereby bonds to the silicone adhesive agent strongly and, thereby, an adhesive remains on the substrate.

If a too much amount of the antioxidant is contained in the silicone adhesive composition, the silicone adhesive composition is turbid. A curing reaction is obstructed in a case where the silicone adhesive composition is additive curable. Further, an adhesion strength of the silicone adhesive composition on heating is lower, compared to a silicone adhesive composition containing no antioxidant.

Japanese Patent No. 5032767 describes an adhesive tape wherein an amount of low molecular weight siloxane in a silicone adhesive composition is decreased. The silicone adhesive composition comprises an addition reaction product (A) obtained by reacting an organopolysiloxane (a) which has alkenyl groups at the both terminals, a viscosity of 10,500 to 60,000 mPa·s, and is accompanied with a decreased amount of low molecular weight siloxanes and a diorganohydrogenpolysiloxane (b) having hydrogen atoms each bonded to a silicone atom at the both terminals. This Patent Publication describes that the amount of low molecular weight siloxanes is decreased by thin-layer stripping. However, when the viscosity of the organopolysiloxane is larger than the aforesaid upper limit, it is difficult to decrease the amount of low molecular weight siloxanes by thin-layer stripping. Further, the main chain of the addition reaction product (A) in the silicone adhesive composition is —O—Si—CH$_2$—CH$_2$—Si—O—, but not —O—Si—O—Si—O— and, thus, the addition reaction product (A) has many carbon-carbon bonds, so that its heat resistance is poor. The viscosity of component (a) is smaller than that of an organopolysiloxane used in the usual silicone adhesive agent, so that an adhesion strength of the adhesive tape is sometimes poor. Further, the addition reaction product (A) is prepared by the reaction in the presence of a catalyst which may remain in the addition reaction product (A) to cause discoloration, so that transparency of the composition is sometimes poor.

PRIOR LITERATURES

Patent Literature 1: Japanese Patent No. 4619486
Patent Literature 2: Japanese Patent No. 4180353
Patent Literature 3: Japanese Patent No. 5032767

SUMMARY OF THE INVENTION

Problems to be Solved by the Invention

One of the purposes of the present invention is to provide a silicone adhesive composition which has sufficient adhesive and tack properties and excellent heat resistance, even in a case where no antioxidant is comprised, and provides a silicone adhesive composition which does not leave an adhesive material on a substrate in a test described below. The other purpose of the present invention is to provide an adhesive film and an adhesive tape having a cured layer obtained from the composition.

Means to Solve the Problems

The present inventors have found that a decrease of an amount of octamethylcyclotetrasiloxane and decamethylcyclopentasiloxane in a silicone adhesive composition decreases adhesive residue.

Thus, the present invention provides an addition curable or peroxide curable silicone adhesive composition, wherein the addition curable silicone adhesive composition comprises (A1) a diorganopolysiloxane having an alkenyl group and a viscosity at 25 degrees C. of 100,000 mPa·s or more, (B) an organopolysiloxane having $R^1_3SiO_{0.5}$ units and $SiO_2$ units, wherein $R^1$ is a substituted or unsubstituted, monovalent hydrocarbon group having 1 to 10 carbon atoms, (C) an organohydrogenpolysiloxane having at least three SiH groups, (D) optionally an addition reaction inhibitor, (E) a platinum group metal catalyst for an addition reaction, and (F) an organic solvent, and the peroxide curable silicone adhesive composition comprises (A2) a diorganopolysiloxane having a viscosity at 25 degrees C. of 100,000 mPa·s or more and may or may not have an alkenyl group, (B) an organopolysiloxane having $R^1_3SiO_{0.5}$ units and $SiO_2$ units, wherein $R^1$ is a substituted or unsubstituted, monovalent hydrocarbon group having 1 to 10 carbon atom, (F) an organic solvent, and (G) an organic peroxide, and components (A1) and (A2) may be accompanied with octamethylcyclotetrasiloxane and/or decamethylcyclopentasiloxane and each content of octamethylcyclotetrasiloxane and decamethylcyclopentasiloxane is less than 0.1 mass %, based on a total amount of component (A1) or (A2), component (B) and octamethylcyclotetrasiloxane and decamethylcyclopentasiloxane. Further, the present invention provides a method for the preparation of the silicone adhesive composition, an adhesive film and an adhesive tape which have a substrate, wherein at least one surface of the substrate has a layer obtained by curing the silicone adhesive composition.

Effects of the Invention

The present silicone adhesive composition does not contain an antioxidant and, therefore, has good workability on curing, sufficient adhesion and tack properties and excellent heat resistance, and provides a cured product which remains no adhesive in a test as described below. Octamethylcyclotetrasiloxane and decamethylcyclopentasiloxane are volatile. When a cured product obtained from an adhesive composition having large amounts of these compounds is attached to an electronic product, the aforesaid volatile materials present in the adhesive composition gradually volatilize to cause bad contact. In contrast, amounts of the aforesaid volatile materials in the present silicone adhesive composition are small, so that bad contact is avoided. Therefore, the present silicone adhesive composition is suitable for electronic parts. Further, when the silicone adhesive composition is cured by heating in an oven, amounts of the aforesaid siloxanes which volatilize in the oven are small, so that generation of a dust such as silica in the oven is prevented. Therefore, a work for cleaning an oven is reduced and extraneous materials such as silica are not seen on a surface of the cured product. Additionally, the present silicone adhesive composition, the adhesive film and the adhesive tape are preferable in various, uses because the amount of adhesive residue of the silicone on a substrate is decreased.

BEST MODE OF THE INVENTION

The present silicone adhesive composition will be described below in detail.

Diorganopolysiloxanes (A1) and (A2) have a viscosity at 25 degrees C. of 100,000 mPa·s or more. If the viscosity is less than 100,000 mPa·s, a coating property is worse, so that cissing occurs on the coating and a sufficient strength of bond between a cured product of the adhesive composition and a film substrate cannot be obtained. The present diorganopolysiloxane is, for instance, prepared by ring-opening polymerization of a cyclosiloxane. The aforementioned octamethylcyclotetrasiloxane and decamethylcyclopentasiloxane are produced in the preparation or already contained in the starting compound. The present diorganopolysiloxane (A1) and (A2) may be accompanied with octamethylcyclotetrasiloxane and/or decamethylcyclopentasiloxane, but each content of octamethylcyclotetrasiloxane and decamethylcyclopentasiloxane shall be smaller than the specific amount. The contents of octamethylcyclotetrasiloxane and decamethylcyclopentasiloxane are determined with gas chromatography. This is the characteristic of the invention. The conditions of gas chromatography may be properly selected according to conventional manners.

Components (A1) and (A2) may be in an oil or raw rubber-like state. In a case where component (A1) or (A2) is raw rubber-like state and has a high viscosity such as more than 500,000 mPa·s, a viscosity of a 30 mass % solution of component (A1) or (A2) in toluene, hereinafter referred to as a 30% solution viscosity, is preferably 100,000 mPa·s or less. The 30% solution viscosity is further preferably 1,000 to 60,000 mPa·s. If the 30% solution viscosity is higher than 100,000 mPa·s, a viscosity of a composition is too high, so that it is difficult to stir the composition in its preparation. In the present invention, a viscosity at 25 degrees C. is determined with a rotary viscometer.

Component (A1) is used in an addition curable silicone adhesive composition and, therefore, has an alkenyl group necessarily. Component (A2) is used in a peroxide curable silicone adhesive composition and, therefore, may or may not have an alkenyl group.

Components (A1) and (A2) are one or more of diorganopolysiloxanes represented by the following formula (1), (2) or (3):

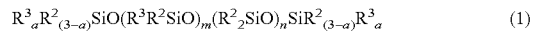

$$R^3_aR^2_{(3-a)}SiO(R^3R^2SiO)_m(R^2_2SiO)_nSiR^2_{(3-a)}R^3_a \quad (1)$$

$$HOR^2_2SiO(R^3R^2SiO)_m(R^2_2SiO)_nSiR^2_2OH \quad (2)$$

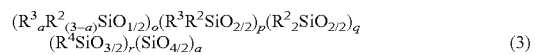

$$(R^3_aR^2_{(3-a)}SiO_{1/2})_o(R^3R^2SiO_{2/2})_p(R^2_2SiO_{2/2})_q(R^4SiO_{3/2})_r(SiO_{4/2})_s \quad (3)$$

In the formulas (1) to (3), $R^2$ is, independently of each other, a substituted or unsubstituted, monovalent hydrocarbon group having no aliphatic unsaturated bond, $R^3$ is, independently of each other, a monovalent organic group having an alkenyl group, a is an integer of from 0 to 3, m is an integer of 0 or more, n is an integer of 100 or more, a total of m and n is such that the viscosity of the diorganopolysiloxane at 25 degrees C. is 100,000 mPa·s or more, $R^4$ is, independently of each other, selected from the groups defined for $R^2$ and $R^3$, o is an integer of from 3 to 12, p is a integer of 0 or more, q is an integer of 100 or more, a total of r and s is an integer of from 1 to 5, a total of o, p, q, r and s is such that the viscosity of the dioraganopolysiloxane at 25 degrees C. is 100,000 mPa·s or more, provided that for component (A1), m in the formula (1) is 2 or more when a is 0; m in the formula (2) is 2 or more; and p in the formula (3) is 2 or more when a is 0. In component (A1), a is preferably 1.

$R^2$ is preferably a hydrocarbon group having 1 to 10 carbon atoms such as alkyl groups such as a methyl group, an ethyl group, a propyl group and a butyl group; cycloalkyl groups such as a cyclohexyl group; aryl groups such as a phenyl group and a tolyl group, and those groups where a part or the whole of their hydrogen atoms bonded to carbon atoms are replaced with a halogen atom, an amino group, a hydroxy group or a cyano group, such as a 3-aminopropyl group, 3,3,3-trifluoropropyl group, 3-hydroxypropyl group and a 3-cyanopropyl group. In particular, a methyl group and a phenyl group are preferable.

$R^3$ is preferably an organic group having 2 to 10 carbon atoms such as a vinyl group, an allyl group, a hexenyl group, an octenyl group, an acryloylpropyl group, an acryloylmethyl group, a methacryloylpropyl group and a vinyloxypropyl group. Among these, a vinyl group is industrially preferable. In a case where the silicone adhesive composition is addition curable, an amount of the alkenyl group in component (A1) is preferably 0.075 to 3.0 mole %, based on total mole of the organic groups in the diorgonopolysiloxane, in view of adhesive property. If the amount of the alkenyl group is less than the aforesaid lower limit, the composition does not sufficiently cure and an adhesive remains on a substrate after releasing the cured product from the substrate. If the amount of the alkenyl group is larger than the upper limit, a coating obtained by curing the composition is too hard, so that it is difficult to bond the coating to a substrate. Component (A1) may be in combination of two or more diorganopolysiloxanes. In this case, a total amount of the alkenyl groups in the diorganopolysiloxanes may be 0.075 to 3.0 mole %, based on total mole of the organic groups in the diorganopolysiloxanes. In a case where the silicone adhesive composition is peroxide curable, an amount of the alkenyl group in component (A2) is not limited to any particular one. However, if the amount is too large, this is economically disadvantageous.

Component (B) is an organopolysiloxane having $R^1_3SiO_{0.5}$ units and $SiO_2$ units. Preferably, a ratio of the number of the $R^1_3SiO_{0.5}$ units to the number of the $SiO_2$ units is 0.6 to 1.7. If the ratio is less than the aforesaid lower limit, its adhesion property and tack property may be lower. If the ratio is larger than the aforesaid upper limit, its adhesion strength and strength of bond between a cured product of the adhesive composition and a film substrate may be lower.

$R^1$ is a substituted or unsubstituted, monovalent hydrocarbon group having 1 to 10 carbon atoms such as alkyl groups such as a methyl group, an ethyl group, a propyl group and a butyl group; cycloalkyl groups; aryl groups such as a phenyl group; and alkenyl groups such as a vinyl group, an allyl group and a hexenyl group, and those groups where a part or the whole of their hydrogen atoms bonded to carbon atoms are replaced with a halogen atom, an amino group, a hydroxy group or a cyano group, such as a 3-aminopropyl group, 3,3,3-trifluoropropyl group, 3-hydroxypropyl group and a 3-cyanopropyl group. In particular, a methyl group is preferable.

Component (B) may have an OH group. A content of the OH group is 0.01 to 4.0 mass %, based on a total mass of component (B). If the content is less than the lower limit, cohesion of the adhesive composition may be lower. If the content is larger than the upper limit, a tack property of the adhesive composition may be lower.

Component (B) may be in combination of two or more organopolysiloxanes. Further, component (B) may have $R^1SiO_{1.5}$ units and $R^1_2SiO$ units as long as the effects of the present invention are not obstructed.

Amounts of component (A1) or (A2) and component (B) are such that a mass ratio of component (A1) or (A2) to component (B) is 99/1 to 25/75, preferably 95/5 to 30/70, further preferably 90/10 to 35/65. If the amount of component (B) is smaller than the aforesaid lower limit, the amount of component (A1) or (A2) is too large, so that the component (A1) or (A2) tends to oxidize and deteriorate, and cause an adhesive residue. If the amount of component (B) is larger than the aforesaid upper limit, the excessive amount of component (B) appears on a surface of a coating of the adhesive composition and causes stain. In particular, when the mass ratio is 90/10 to 35/65, the cured product has sufficient adhesion strength and tack and an amount of an adhesive residue is smaller.

Component (C) is an organohydrogenpolysiloxane having at least three SiH groups and is a crosslinking agent comprised in the addition curable composition. This organohydrogenpolysiloxane may be linear or branched.

Examples of component (C) include the following compounds, but are not limited to these.

$$H_bR^2_{(3-b)}SiO(HR^2SiO)_t(R^2_2SiO)_uSiR^2_{(3-b)}H_b$$

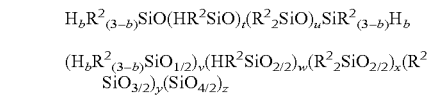

wherein $R^2$ is, independently of each other, a substituted or unsubstituted, monovalent hydrocarbon group having no aliphatic unsaturated bond, b is 0 or 1, t is an integer of 1 or more, u is an integer of C or more, t is an integer of 3 or more when b is 0, a total of t and u is such that the viscosity of the organohydrogenpolysiloxane at 25 degrees C. is 1 to 1,000 mPa·s, v is an integer of from 3 to 12, w is an integer of 0 or more, y and a is an integer of from 1 to 5, a total of v, w, x, y and z is such that the viscosity of the organohydrogenpolysiloxane at 25 degrees C. is 1 to 1,000 mPa·s.

$R^2$ is preferably a hydrocarbon group having 1 to 10 carbon atoms such as alkyl groups such as a methyl group, an ethyl group, a propyl group and a butyl group; cycloalkyl groups such as a cyclohexyl group; aryl groups such as a phenyl group and a tolyl group, and those groups where a part or the whole of their hydrogen atoms bonded to carbon atoms are replaced with a halogen atom, an amino group, a hydroxy group or a cyano group, such as a 3-aminopropyl group, 3,3,3-trifluoropropyl group, 3-hydroxypropyl group and a 3-cyanopropyl group. In particular, a methyl group and a phenyl group are preferable.

The viscosity of the organohydrogenpolysiloxane at 25 degrees C. is preferably 1 to 1,000 mPa·s, more preferably 2 to 500 mPa·s. Component (C) may be in combination of two or more organohydrogenpolysiloxane. Further, the organohydrogenpolysiloxane may have $[R^2SiO_{3/2}]$, $[HSiO_{3/2}]$ and/or $[SiO_{4/2}]$ units.

An amount of component (C) is such that a ratio of the number of SiH groups in component (C) to the number of alkenyl groups in components (A1) and (B) is 0.5 to 20, particular 0.8 to 15. If the ratio is less than the lower limit, a degree of crosslinking is lower and, therefore, cohesion and a strength of bond between a cured product of the adhesive composition and a film substrate may be lower. Even if the ratio is larger than the upper limit, a degree of crosslinking does not become higher any more, this is economically disadvantageous.

Component (D) is an addition reaction inhibitor which is optionally comprised in the addition curable composition. When the silicone adhesive composition is prepared, applied on a substrate and, then, heated to be cured, component (D) added to the silicone adhesive composition works to prevent increase of a viscosity and gelation of the silicone adhesive composition before heat curing. Examples of component (D) include 3-methyl-1-butyn-3-ol, 3-methyl-1-penthyn-3-ol, 3,5-dimethyl-1-hexyn-3-ol, 1-ethynylcyclohexanol, 3-methyl-3-trimethylsiloxy-1-butyne, 3-methyl-3-trimethyl-siloxy-1-penthyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane and 1,1,3,3-tetramethyl-1,3-divinyldisiloxane.

An amount of component (D) is 0 to 8.0 parts by mass, relative to total 100 parts by mass of components (A1) and (B), and, particularly 0.05 to 2.0 parts by mass is preferable. If the amount is larger than the upper limit, curability of the composition may be lower.

Component (E) is an addition reaction catalyst comprised in the addition curable composition. Examples of component (E) include platinum catalysts such as a chloroplatinic acid, an alcohol solution of a chloroplatinic acid, a reaction product of a chloroplatinic acid and an alcohol, a reaction product of a chloroplatinic acid and an olefin, a reaction product of a chloroplatinic acid and a vinyl group containing siloxane, a complex of a platinum with an olefin, and a complex of a platinum with a vinyl group containing siloxane; and platinum group metal catalysts such as rhodium complexes and ruthenium complexes. These catalysts may be dissolved or dispersed in a solvent such as isopropanol and toluene or a siloxane oil, before use.

An amount of component (E) is such that an amount of platinum group metal is 5 to 2,000 ppm, particularly 10 to 500 ppm, based on a total amount of components (A1) and (B). If the amount is smaller than the aforesaid lower limit, curability of the composition is lower and a degree of crosslinking is lower, so that a strength of bond between a cured product of the adhesive composition and a film substrate may be lower. If the amount is larger than the upper limit, a time period for a composition bath to be usable may be shorter.

Component (G) is an organic peroxide comprised in the peroxide curable composition. Any organic peroxide may be used as long as it generates free oxygen radical through its decomposition. Examples of component (G) include, dibenzoyl peroxide, 4,4'-dimethyldibenzoyl peroxide, 3,3'-dimethyldibenzoyl peroxide, 2,2'-dimethyldibenzoyl peroxide, 2,2',4,4'-tetrachlorodibenzoyl peroxide and cumyl peroxide.

Any state of component (G) may be used. For instance, component (G) may be used as such or in such a manner that component (G) is diluted with an organic solvent, that component (G) is dispersed in water, or that component (G) is dispersed in a silicone oil to be pasty. Component (G) may be used alone or in combination of two or more of it.

An amount of component (G) may be an effective amount. The effective amount varies depending on a curing temperature or a decomposition temperature of the peroxide. For instance, the amount of component (G) may be approximately 0.5 to 5 parts by mass, particularly 0.8 to 3 parts by mass, relative to total 100 parts by mass of components (A2) and (B). If the amount is smaller than the lower limit, curability of the composition is lower, so that a strength of bond between a cured product of the adhesive composition and a film substrate is lower and an adhesive tends to remain on a substrate. If the amount is larger than the upper limit, discoloration may occur on a surface of an adhesive layer and a tack property of a cured product may be lower.

Component (F) is an organic solvent and is comprised in both of the addition curable composition and the peroxide curable composition. Examples of component (F) include aromatic hydrocarbon solvents such as toluene and xylene; linear or branched aliphatic hydrocarbon solvents such as hexane, heptane, octane, isooctane, decane, cyclohexane, methylcyclohexane and isoparaffin; hydrocarbon solvents such as industrial gasoline, petroleum benzine and solvent naphtha; ketone solvents such as acetone, methyl ethyl ketone, 2-pentanone, 3-pentanone, 4-hexanone, 2-heptanone, 4-heptanone, methyl isobutyl ketone, diisobutyl ketone, acetonitrile acetone and cyclohexanone, ester solvents such as ethyl acetate, propyl acetate, isopropyl acetate, butyl acetate and isobutyl acetate; ether solvents such as diethyl ether, dipropyl ether, diisopropyl ether, dibutyl ether, 1,2-dimethoxyethane and 1,4-dioxane; solvents having an ester and ether groups such as 2-methoxyehtyl acetate, 2-ethoxyethyl acetate, propylene glycol monomethyl ether acetate and 2-butoxy ethyl acetate; and mixed solvents thereof.

Among these, aromatic hydrocarbon solvents such as toluene and xylene; and linear or branched aliphatic hydrocarbon solvents such as hexane, heptane, isooctane, octane, decane and cyclohexane, methylcyclohexane and isoparaffin are preferable. Further, mixed solvents of the linear or branched aliphatic hydrocarbon solvent and the solvent having an ester and ether groups are also preferable.

The present silicone adhesive composition may further contain optional materials other than the aforesaid components. For instance, examples include organopolysioxanes having one or two SiH groups; antioxidants such as a phenol, kinone, amine, phosphorus, phosphite, sulfur or thioether antioxidant; light stabilizers such as a hinderdamine, triazole or benzophenone light stabilizer; flame retardants such as a phosphate ester, halogen, phosphorus or antimon flame retardant; antistatic additives such as cationic activates, anionic activates and nonionic activates; dyes and pigments. The addition curable composition may comprise a non-reactive organopolysiloxane which has no alkenyl group such as a dimethylpolysiloxane and dimethyldiphenylpolysiloxane.

The present addition curable adhesive composition is prepared by mixing components (A1), (B), (C), (D) and (F), and optional materials if needed, and dissolving each other, then, adding component (E) to the mixture and mixing them. The present peroxide curable adhesive composition is prepared by mixing components (A2), (B) and (F), and optional materials if needed, and dissolving each other, then, adding and component (G) to the mixture and mixing them.

Component (A1) or (A2) and component (B) may be reacted to cause dehydration condensation for a proper time in the presence of a base catalyst and optionally a part or whole amount of component (F) to remove hydroxyl groups bonded to silicon atoms present in components (A1) or (A2) and (B), and the product obtained may be used as a part or whole of component (A1) or (A2) and component (B). Examples of the base catalyst include metal hydroxides such as lithium hydroxide, sodium hydroxide, potassium hydroxide and calcium hydroxide; carbonates such as sodium carbonate and potassium carbonate, hydrogencarbonates such as sodium hydrogen carbonate, metal alkoxides such as sodium methoxide and potassium butoxide; organic metals such as butyllithium; a complex of potassium hydroxide and a siloxanes; and nitrogen compounds such as an ammonia gas, an aqueous solution of ammonia, methylamine, trimethylamine and triethylamine. Among these, an ammonia gas and an aqueous solution of ammonia are preferable. The reaction temperature may be 20 to 150 degrees C., usually room temperature to a reflux temperature of component (F). The reaction time may be 0.5 to 10 hours, preferable 1 to 6 hours, but not limited to these.

After finishing the aforesaid reaction, a neutralizer may be added to the reaction mixture so as to neutralize the base catalyst. Examples of the neutralizer include acid gas such as hydrogen chloride and carbon dioxide; organic acids such as acetic acid, octanoic acid and citric acid; and mineral acid such as hydrochloric acid, sulfuric acid and phosphoric acid.

Desired adhesion strength of the present additional curable adhesive composition is provided, for instance, by controlling the amount of the alkenyl group in component (A1) and the mass ratio of component (A1) to component (B). Desired adhesion strength of the present peroxide curable adhesive composition is provided, for instance, by controlling the mass ratio of component (A2) to component (B), the amount of the peroxide curing agent and the curing conditions.

The present adhesive composition is characterized in that the each content of octamethylcyclotetrasiloxane and decamethylcyclopentasiloxane is less than 0.1 mass % (1000 ppm), based on a total mass of component (A1) or (A2), component (B) and the aforesaid siloxanes. Preferably, the each content of octamethylcyclotetrasiloxane and decamethylcyclopentasiloxane is less than 0.1 mass % (1000 ppm), based on a total mass of component (A1) or (A2) and the aforesaid siloxanes.

Components (A1) and (A2) which are accompanied with the aforesaid amount of the aforesaid amount of octamethylcyclotetrasiloxane and/or decamethylcyclopentasiloxane are prepared by stripping or solvent extraction, as described below.

A method for preparing components (A1) and (A2) by stripping comprises steps of dissolving the diorganopolysiloxane having a viscosity at 25 degrees C. of 100,000 mPa·s or more and may or may not have an alkenyl group, hereinafter referred to as "diorganopolysiloxane (A')", in a solvent having a boiling point of 100 degrees C. or higher and, then, subjecting the solution to stripping. Because diorganopolysiloxane (A') has a high viscosity, 100,000 mPa·s or more, each amount of octamethylcyclotetrasiloxane and decamethylcyclopentasiloxane is not sufficiently decreased in ordinary stripping without any solvent. Diorganopolysiloxane (A') is soluble in organic solvents, component (F). On account of the steps of dissolving diorganopolysiloxane (A') in component (F) and, then, subjecting the solution to stripping, octamethylcyclotetrasiloxane and decamethylcyclopentasiloxane with which diorganopolysiloxane (A') is accompanied are stripped off together with component (F) to obtain the desired component (A1) or (A2). Stripping conditions are not particularly limited. The stripping may be conducted at a temperature and a pressure such that octamethylcyclotetrasiloxane, decamethylcyclopentasiloxane and component (F) are stripped off together, usually 50 to 2000 degrees C. and 10 mmHg to 100 mmHg (1.333 kPa to 13.33 kPa).

Component (F) which dissolves diorganopolysiloxane (A') preferably has a boiling point of 100 degrees C. or more, more preferably a boiling point of at most 100 degrees C. and less than 230 degrees C. If the boiling point of the solvent is less than 100 degrees C., the solvent is stripped off too early to sufficiently remove octamethylcyclotetrasiloxane and decamethylcyclopentasiloxane. If the boiling point of the solvent is higher than 230 degrees C., stripping does not proceed sufficiently, an excessive energy for heating is needed, and the solvent remains in component (A1) or (A2), in the adhesive film and the adhesive tape at last, which are not preferable. Particularly, toluene and xylene are preferable.

The aforesaid step of stripping may be repeated several times until each content of octamethylcyclotetrasiloxane and decamethylcyclopentasiloxane become less than 0.1 mass %, based on a total amount of diorganopolysiloxane, octamethylcyclotetrasiloxane and decamethylcyclopentasiloxane.

A method for preparing components (A1) and (A2) by solvent extraction comprises steps of dissolving diorganopolysiloxane (A') in an organic solvent which can dissolve high molecular weight polysiloxanes having a degree of polymerization of 100 or more, and, then, subjecting the solution to extraction with an organic solvent which can dissolve octamethylcyclotetrasiloxane and decamethylcyclopentasiloxane and cannot dissolve the aforesaid high molecular weight polysiloxane to remove octamethylcyclotetrasiloxane and decamethylcyclopentasiloxane.

Diorganopolysiloxane (A') is soluble in organic solvents, component (F), but the main component of diorganopolysiloxane (A'), i.e. a high molecular weight polysiloxane having a degree of polymerization of 100 or more, is hardly soluble or insoluble in polar solvents such as alcohol solvents, polyether solvents and glycerine solvents. In contrast, octamethylcyclotetrasiloxane and decamethylcyclopentasiloxane are low molecular-weight polysiloxanes with a degree of polymerization of 4 or 5, so that they are soluble in the polar solvents.

Therefore, when diorganopolysiloxane (A') accompanied with octamethylcyclotetrasiloxane and/or decamethylcyclopentasiloxane is brought into contact with the polar solvents, octamethylcyclotetrasiloxane and decamethylcyclopentasiloxane are dissolved in the polar solvents to leave behind the desired component (A1) or (A2).

A manner for bringing the extraction polar solvents into contact with diorganopolysiloxane (A') is not limited to any particular one. Preferably, first, diorganopolysiloxane (A') is dissolved in an organic solvent which is less compatible with a polar extraction solvent, such as aromatic hydrocarbon solvents such as toluene and xylene; aliphatic hydrocarbon solvents such as hexane, heptane, isooctane, octane, decane, cyclohexane, methylcyclohexane and isoparaffin and, then, the solution is brought into contact with the polar extraction solvent. Because the organic solvents is less compatible with the polar extraction solvent, the polar extraction solvent is easily separated from the organic solvent after the extraction with a small loss.

For instance, diorganopolysiloxane (A') dissolved in the organic solvent is mixed with the polar extraction solvent, stirred and, then, left standing to cause phase separation. Subsequently, the polar extraction solvent phase is removed from the organic solvent phase. The aforesaid step of the extraction is repeated as needed, optionally with heating, to completely remove the polar extraction solvent to thereby obtain component (A1) or (A2).

Any polar extraction solvent may be used as long as it dissolves octamethylcyclotetrasiloxane and decamethylcyclopentasiloxane and does not dissolve the high molecular-weight polysiloxane. Alcohols, polyethers and glycerines are preferable. Among these, alcohols having a low boiling point are preferable.

The alcohols having a low boiling point are preferably alcohols having 5 carbon atoms or less, further preferably alcohols having 3 carbon atoms or less, and particularly methanol, ethanol and isopropylalcohol. Among these, methanol is most preferable. Use of the low boiling point alcohol having 5 carbon atoms or less is advantageous in that such an alcohol is easily removed by heating the organic solvent which dissolved a high molecular-weight polysiloxane, at a temperature above the boiling point of the low boiling point alcohol but below the boiling point of the organic solvent, after separation of the extraction polar solvent.

The present silicone adhesive composition is applied on at least one surface of a film substrate and cured in proper conditions to form an adhesive coating to thereby prepare an adhesive film or an adhesive tape.

Examples of the film substrate includes plastic films such as a polyester, a poly(meth)acrylate, a polycarbonate, a polyethylene, a polypropylene, a polystyrene, a polyamide, a polyimide, a polyphenylene sulfide, a polytetrafluoroethylene, a polyether ketone, a polyvinyl chloride, a polyurethane, a triacetylcellulose, a polyacetal, a norbornene resin such as ARTON (trademark registration), ex JSR Corporation, a cycloolefin polymer resins such as ZEONOR (trademark registration), ex Zeon Corporation, an epoxy resin and a phenol resin. These may be used as a single layer film or a laminated film having two or more layers. Preferred are polyester films such as polyethylene tereftalate, polybutylene terephthalate and polybutylene naphthalate, polyimide films, polyacrylate films such as polyacrylate and polymethacrylate, polyether ketone such as polyether ether ketone and polycarbonate films.

The thickness of the film substrate may be 2 to 300 µm, preferably 10 to 150 µm, but not limited to these.

The film substrate may be treated in advance in order to improve adhesiveness with the adhesive coating, such as primer treatment, corona treatment, etching treatment, plasma treatment and sandplasma treatment. Preferred is a corona treated or primer treated film substrate.

Another surface of the film substrate which does not have the adhesive coating may be treated so as to have scratch resistance, stain resistance, fingerprint resistance, glare resistance, reflection resistance, and an antistatic property. The treatment may be conducted after or before forming the adhesive coating on the reverse surface.

Examples of the treatment for scratch resistance are hard coating treatment with hardcoat agents such as acrylate, siloxane, oxetane, inorganic and organic-inorganic hybrid hardcoat agents.

Examples of the treatment for stain resistance include treatments with stain resistant agents such as fluorine, siloxane, ceramic and photo catalyst agents.

Examples of the treatment for reflection resistance include wet treatment or dry treatment by vapor deposition and sputtering on a surface with a fluorine or siloxane reflection resistant agent.

Examples of the treatment for the antistatic property include treatments with antistatic agents of, for instance, surfactant type, siloxanes type, organic boron type, conductivity polymer type, metallic oxide type and vapor deposited metal types.

The present silicone adhesive composition may be applied in any conventional manners. Examples include a comma coater, a lip coater, a roll coater, a die coater, a knife coater, a blade coater, a rod coater, a kiss coater, a gravure coater, a screen coating, a dip coating, a cast coating and a spray coating.

The thickness of the adhesive coating after cured may be 2 to 200 µm, preferably 3 to 100 µm, further preferably 30 to 100 µm. If the thickness is less than the aforesaid lower limit, sufficient adhesion strength is not obtained. If the thickness is larger than the aforesaid upper limit, the adhesion strength is too large, which is economically disadvantageous.

Conditions of the addition curing may be 80 to 130 degrees C. for 30 seconds to 3 minutes, but is not limited to these. Conditions of the peroxide curing are decided by a decomposition temperature of the peroxide to be used, for instance, 130 to 200 degrees C. for 3 to 5 minutes, but is not limited to these.

An adhesive film and an adhesive tape may be prepared by applying the adhesive composition directly on a film substrate. Further, they may be prepared by a transfer method wherein the adhesive composition is applied on a releasing film or a releasing paper coated with a releasing agent, the adhesive composition is cured and, then, the adhesive side is bonded to a film substrate. A protecting film may be attached on the adhesive coating, if needed, in order to protect the adhesive coating when the present adhesive film and adhesive tape are stored and transported.

The adhesive film and the adhesive tape having a layer obtained by curing the present silicone adhesive composition are used as protective films for the preparation of various optical films and protective films for the preparation of electronic products. For instance, the adhesive film is used as a protecting film or masking film for processing optical products such as polarizing plates and light diffusion plates. Further, the adhesive film is used as a heat resistant masking tape for processing electronic products such as flexible printed circuit boards.

EXAMPLES

The present invention will be explained in detail by reference to the Examples and the Comparative Examples, but shall not be limited thereto. In the following description, "part" is an abbreviation for part by mass, "%" is an abbreviation for mass %, "Me" is an abbreviation for a methyl group and "Vi" is an abbreviation for a vinyl group. A viscosity at 25 degrees C. was determined with a rotary viscometer.

Conditions in GC, i.e., gas chromatography, were as follows.
Gas chromatograph: capillary gas chromatograph, G-3500, ex Hitachi High-Tech Science Corporation
Capillary column: DB-5MS (0.53 mm×30 m×1.0 micrometer), ex J & W.
Detector: FID, temperature of 300 degrees C.
Temperature rise program: 50 degrees C., 10 degrees C./minute and, then, maintained at 280 degrees C. for 17 minutes
Temperature at an inlet: 270 degrees C.
Carrier gas: Helium at a flow rate of 5 ml/minute
Injection volume: 2 microliters
The following tests were conducted.
Initial Adhesion Strength A silicone adhesive composition was applied on a polyimide film having a thickness of 23 µm so as to provide a coating having a thickness of 30 µm with an applicator and, then, heated at 130 degrees C. for one minute to cure to thereby prepare an adhesive film. The adhesive film was cut into a tape having a width of 25 mm, which was put on a stainless steel, SUS304, plate, with the adhesive facing to the stainless steel plate. Then, the adhesive film was pressed with two cycles of going and returning of a 2 kg roller covered with a rubber layer to prepare a test sample. The test sample was left at room temperature for about 20 hours. Then, the tape was peeled from the stainless steel plate at an angle of 180° and a rate of 300 mm/min with a tensile testing machine to determine a power, in N/25 mm, needed for peeling the adhesive tape from the stainless steel plate.

Adhesive Residue

The adhesive film prepared in the same manners as in the aforesaid test was cut into a tape having a width of 25 mm, which was put on a stainless steel, SUS304, plate, with the adhesive facing to the stainless steel plate and, then, the adhesive film was pressed with two cycles of going and returning of a 2 kg roller covered with a rubber layer to prepare a test sample. The test sample was left at room temperature for about 20 hours and, then, further in a desiccator of a predetermined temperature, 250, 270 or 290 degrees C., for 2 hours. The test sample was took out from the desiccator and left to cool at room temperature and, then, peeled from the stainless steel plate. The surface of the stainless steel plate was observed with the naked eyes to evaluate in the following criteria.

Good: None adhesive residue is observed.
Bad: Adhesive residue is observed.

Preparation Example 1

Preparation of Components (A1) and (A2) by Stripping

100 Parts by weight of diorganopolysiloxane (A') of a caoutchouc state, which was represented by the following formula (4), had a viscosity of 18,000 mPa·s as a 30% solution in toluene, and had 0.15 mole % of a vinyl group was dissolved in 100 parts by weight of toluene to prepare a toluene solution. The toluene solution was subjected to stripping one time at 160 degrees C. and 20 mmHg to obtain component (A1). The aforesaid mole % of the vinyl group was based on total moles of the organic groups, i.e. a methyl group and a vinyl group, in diorganopolysiloxane (A').

$$XMe_2SiO(ViMeSiO)_m(Me_2SiO)_nSiMe_2X \quad (4)$$

wherein both of X are a Vi group or OH, m and n are as defined above and a total of m and n is such that the viscosity of the dioraganopolysiloxane is 18,000 mPa·s as a 30% solution in toluene.

Component (A1) obtained was dissolved in toluene again and each amount of octamethylcyclotetrasiloxane and decamethylcyclopentasiloxane with which component (A1) was accompanied was determined with gas chromatography. This component (A1) was used in the following Example 1.

The same procedures were repeated to prepare various components (A1) and (A2), except that diorganopolysiloxane (A') described in Table 1 was used instead of the aforesaid diorganopolysiloxane (A') and stripping was conducted with the solvent and the repetition number described in Table 1. Then, each amount of octamethylcyclotetrasiloxane and decamethylcyclopentasiloxane with which component (A1) or (A2) was accompanied was determined. The results are as shown in Table 1.

Example 1

Mixed were 35 parts of component (A1) obtained in Preparation Example 1,
108.3 parts of a 60% solution in toluene of an organopolysiloxane having $Me_3SiO_{0.5}$ units and $SiO_2$ units, component (B), wherein a mole ratio of $Me_3SiO_{0.5}$ units to $SiO_2$ units was 0.85,
23.7 parts of toluene,
0.22 part of an SiH group-containing organohydrogenpolysiloxane, component (C), represented by the following formula,

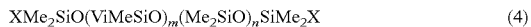

$$Me_3SiO(HMeSiO)_{40}SiMe_3,$$

and 0.20 part of ethynylcyclohexanol, component (D).

50 Parts of toluene and 0.5 part of a solution of a complex of platinum with a vinyl group-containing siloxane in toluene, which contained 0.5 mass % of platinum, component (E), were added to 100 parts of the aforesaid mixture containing approximately 60% of siloxane moieties, and mixed to prepare a silicone adhesive composition containing approximately 40% of siloxane moieties. The silicone adhesive composition was subjected to the aforesaid tests. The results are as shown in Table 2.

Example 2 and Comparative Examples 1 and 2

The procedures in Example 1 were repeated to prepare a silicone adhesive composition containing approximately 40% of siloxane moieties, except that component (A1) or (A2) described in Table 1 was used in a mass ratio of component (A1) or (A2) to component (B) as described in Table 2 instead of component (A1) used in Example 1 and the amount of component (C) was changed as described in Table 2. The silicone adhesive composition was subjected to the aforesaid tests. The results are as shown in Table 2.

Examples 3 to 4 and Comparative Examples 3 to 5

The procedures in Example 1 were repeated to prepare a silicone adhesive composition containing approximately 40% of siloxane moieties, except that component (A1) or (A2) described in Table 1 was used in a mass ratio of component (A1) or (A2) to component (B) as described in Table 2 instead of component (A1) used in Example 1, components (C) and (D) were not used, and 1.2 parts of benzoyl peroxide, component (G), was used instead of component (E). The silicone adhesive composition was subjected to the aforesaid tests. The results are as shown in Table 2.

TABLE 1

Preparation of component, (A1) or (A2) by stripping

| | | Diorganopolysiloxane (A') | | | | | Content of octamethyl-cyclotetrasiloxane after stripping, ppm | Content of decamethyl-cyclopentasiloxane after stripping, ppm |
|---|---|---|---|---|---|---|---|---|
| | | Vi, mol % | Me, mol % | X at the both terminals in the formula (4) | Viscosity as a 30% solution, Pa·s | Stripping | | |
| | | | | | | Solvent | Repetition number | |
| Example 1 | A1 | 0.15 | 99.86 | Vi | 18000 | Toluene | 1 | 150 | 280 |
| Comparative Example 1 | | 0.15 | 99.85 | Vi | 18000 | None | 0 | 4620 | 5020 |

TABLE 1-continued

Preparation of component, (A1) or (A2) by stripping

| | | Diorganopolysiloxane (A') | | | | | Content of octamethyl-cyclotetrasiloxane after stripping, ppm | Content of decamethyl-cyclopentasiloxane after stripping, ppm |
|---|---|---|---|---|---|---|---|---|
| | | Vi, mol % | Me, mol % | X at the both terminals in the formula (4) | Viscosity as a 30% solution, Pa·s | Stripping Solvent | Repetition number | |
| Example 2 | | 0.45 | 99.55 | Vi | 4300 | Toluene | 1 | 220 | 240 |
| Comparative Example 2 | | 0.45 | 99.55 | Vi | 4300 | None | 0 | 5170 | 6630 |
| Example 3 | A2 | 1.5 | 98.5 | Vi | 21000 | Xylene | 1 | 550 | 600 |
| Comparative Example 3 | | 1.5 | 98.5 | Vi | 21000 | None | 0 | 4800 | 6400 |
| Example 4 | | 0 | 100 | OH | 38400 | Toluene | 3 | 870 | 950 |
| Comparative Example 4 | | 0 | 100 | OH | 38400 | None | 0 | 50800 | 34800 |
| Comparative Example 5 | | 0 | 100 | OH | 38400 | Hexane | 3 | 4500 | 5040 |

TABLE 2

| | Amount of component (C), part | Mass ratio of component (A1) or (A2) to component (B) | Curing | Content of octamethyl-cyclotetrasiloxane, ppm* | Content of decamethyl cyclopentasiloxane, ppm* | Adhesion strength, N/25 mm | Adhesive residue 250 degrees C. | 270 degrees C. | 290 degrees C. |
|---|---|---|---|---|---|---|---|---|---|
| Example 1 | 0.22 | 35/65 | Addition reaction | 52.5 | 98 | 10.4 | Good | Good | Good |
| Comparative Example 1 | 0.22 | 35/65 | | 1617 | 1757 | 10.5 | Good | Bad | Bad |
| Example 2 | 1.08 | 80/20 | | 176 | 192 | 0.1 | Good | Good | Good |
| Comparative Example 2 | 1.08 | 80/20 | | 4136 | 5304 | 0.1 | Good | Bad | Bad |
| Example 3 | 0 | 40/60 | Peroxide | 220 | 240 | 6.4 | Good | Good | Good |
| Comparative Example 3 | 0 | 40/60 | | 1920 | 2560 | 6.4 | Good | Bad | Bad |
| Example 4 | 0 | 45/55 | | 391.5 | 427.5 | 6.2 | Good | Good | Good |
| Comparative Example 4 | 0 | 45/55 | | 22860 | 15660 | 6.2 | Good | Bad | Bad |
| Comparative Example 5 | 0 | 45/55 | | 2025 | 2268 | 6.2 | Good | Bad | Bad |

*The amount based on a total mass of component (A1) or (A2), component (B), octamethylcyclotetrasiloxane and decamethylcyclopentasiloxane.

Preparation Example 2

Preparation of Component (A1) or (A2) by Solvent Extraction

100 Parts by weight of diorganopolysiloxane (A'), which was same as that used in Preparation Example 1, was dissolved in 100 parts by weight of toluene to prepare a toluene solution. 100 parts by weight of methanol was added to the toluene solution, stirred at room temperature for 10 minutes and, then, left standing to cause phase separation. Extraction was conducted one time to separate a toluene phase from a methanol phase to obtain a toluene solution containing component (A1). The toluene phase containing component (A1) was subjected to gas chromatography to determine each amount of octamethylcyclotetrasiloxane and decamethylcyclopentasiloxane with which component (A1) was accompanied. The results are as shown in Table 3. Then, the toluene solution was subjected to stripping at 100 degrees C. and 20 mmHg to remove the remaining methanol. Component (A1) obtained was used in the following Example 5.

The same procedures were repeated to prepare various components (A1) and (A2), except that diorganopolysiloxane (A') described in Table 3 was used instead of the aforesaid diorganopolysiloxane (A') and extraction was conducted with the solvent and the repetition number described in Table 3. Then, each amount of octamethylcyclotetrasiloxane and decamethylcyclopentasiloxane with which component (A1) or (A2) was accompanied was determined. The results are as shown in Table 3.

Example 5

Mixed were 35 parts of component (A1) obtained in Preparation Example 2,
108.3 parts of a 60% solution in toluene of an organopolysiloxane having $Me_3SiO_{0.5}$ units and $SiO_2$ units, component (B), wherein a mole ratio of $Me_3SiO_{0.5}$ units to $SiO_2$ units was 0.85,
23.7 parts of toluene,
0.22 part of an SiH group-containing organohydrogenpolysiloxane, component (C), represented by the following formula,

$Me_3SiO(HMeSiO)_{40}SiMe_3$, and 0.20 part of ethynylcyclohexanol, component (D).
50 Parts of toluene and 0.5 part of a solution of a complex of platinum with vinyl group-containing siloxane in toluene, which contained 0.5 mass % of platinum, component (E), were added to 100 parts of the aforesaid mixture containing approximately 60% of siloxane moieties, and mixed to prepare a silicone adhesive composition containing approximately 40% of siloxane moieties. The silicone adhesive composition was subjected to the aforesaid tests. The results are as shown in Table 4.

Example 6 and Comparative Examples 6 and 7

The procedures in Example 5 were repeated to prepare a silicone adhesive composition containing approximately 40% of siloxane moieties, except that component (A1) or (A2) described in Table 3 was used in a mass ratio of component (A1) or (A2) to component (B) as described in Table 4 instead of component (A1) used in Example 5 and the amount of component (C) was changed as described in Table 4. The silicone adhesive composition was subjected to the aforesaid tests. The results are as shown in Table 4.

Examples 7 to 8 and Comparative Examples 8 to 9

The procedures in Example 5 were repeated to prepare a silicone adhesive composition containing approximately 40% of siloxane moieties, except that component (A1) or (A2) described in Table 3 was used in a mass ratio of component (A1) or (A2) to component (B) as described in Table 4 instead of component (A1) used in Example 5, components (C) and (D) were not used, and 1.2 parts of benzoyl peroxide, component (G), was used instead of component (E). The silicone adhesive composition was subjected to the aforesaid tests. The results are as shown in Table 4.

TABLE 3

Preparation of component (A1) or (A2) by stripping

| | | Diorganopolysiloxane (A') | | | | | | Content of octamethyl-cyclotetrasiloxane after stripping, ppm | Content of decamethyl-cyclopentasiloxane after stripping, ppm |
|---|---|---|---|---|---|---|---|---|---|
| | | Vi, mol % | Me, mol % | X at the both terminals in the formula (4) | Viscosity as 30% solution, Pa·s | Stripping | | | |
| | | | | | | Solvent | Repetition number | | |
| Example 5 | A1 | 0.15 | 99.85 | Vi | 18000 | Methenol | 1 | <10 | <10 |
| Comparative Example 8 | | 0.15 | 99.85 | Vi | 18000 | None | 0 | 4620 | 5020 |
| Example 6 | | 0.45 | 99.55 | Vi | 4300 | Methenol | 1 | <10 | <10 |
| Comparative Example 7 | | 0.45 | 99.55 | Vi | 4300 | None | 0 | 5170 | 6630 |
| Example 7 | A2 | 1.5 | 98.5 | Vi | 21000 | Methenol | 1 | <10 | <10 |
| Comparative Example 8 | | 1.5 | 98.5 | Vi | 21000 | None | 0 | 4800 | 6400 |
| Example 8 | | 0 | 100 | OH | 38400 | Methenol | 3 | <10 | <10 |
| Comparative Example 9 | | 0 | 100 | OH | 38400 | None | 0 | 50800 | 34800 |

TABLE 4

| | Amount of component (C), part | Mass ratio of component (A1) or (A2) to component (B) | Curing | Content of octamethyl-cyclotetrasiloxane, ppm* | Content of decamethyl-cyclopentasiloxane, ppm* | Adhesion strength, N/25 mm | Adhesive residue | | |
|---|---|---|---|---|---|---|---|---|---|
| | | | | | | | 250 degrees C. | 270 degrees C. | 290 degrees C. |
| Example 5 | 0.22 | 35/65 | Addition reaction | <3.5 | <3.5 | 10.3 | Good | Good | Good |
| Comparative Example 6 | 0.22 | 35/65 | | 1617 | 1757 | 10.5 | Good | Bad | Bad |
| Example 6 | 1.08 | 80/20 | | <3.5 | <3.5 | 0.1 | Good | Good | Good |
| Comparative Example 7 | 1.08 | 80/20 | | 4136 | 5304 | 0.1 | Good | Bad | Bad |
| Example 7 | 0 | 40/60 | Peroxide | <3.5 | <3.5 | 6.3 | Good | Good | Good |
| Comparative Example 8 | 0 | 40/60 | | 1920 | 2560 | 6.4 | Good | Bad | Bad |
| Example 8 | 0 | 45/55 | | <3.5 | <3.5 | 6.1 | Good | Good | Good |
| Comparative Example 9 | 0 | 45/55 | | 22860 | 15660 | 6.2 | Good | Bad | Bad |

*The amount based on a total mass of component (A1) or (A2), component (B) octamethylcyclotetrasiloxane and decamethylcyclopentasiloxane.

Comparative Example 10

Diorganopolysioxane of an oily state which was represented by the aforesaid formula (4) wherein both X were a Vi group, had a viscosity of 30,000mPa·s, and had 0.33 mole % of a vinyl group, was subjected to thin-layer stripping to obtain diorganopolysiloxane accompanied with octamethylcyclotetrasiloxane and decamethylcyclopentasiloxane in each amount of less than 10 ppm, based on a total amount of the diorganopolysiloxane, octamethylcyclotetrasiloxane and decamethylcyclopentasiloxane, hereinafter referred to as comparative component (A1).

The procedures in Example 1 were repeated to prepare an adhesive composition, except that the aforesaid comparative component (A1) was used in a mass ratio of comparative component (A1) to component (B) was 40/60 instead of component (A1) used in Example 1, and an amount of component (C) was 0.17 part. The adhesive composition obtained was subjected to the aforesaid tests.

The adhesion strength was so low as 1.5 N/25 mm, though the content of component (B) was large. Adhesive residue was not found at 250 degrees C., but was found at 270 degrees C. and 290 degrees C.

As shown in Tables 2 and 4, the present silicone adhesive composition has an excellent adhesive property and heat resistance. Further, adhesive residue is not found in the aforesaid test at 250 to 290 degrees C.

The invention claimed is:
1. An addition curable or peroxide curable silicone adhesive composition, wherein
the addition curable silicone adhesive composition comprises
(A1) a diorganopolysiloxane having an alkenyl group and a viscosity at 25° C. of 100,000 mPa·s or more,
(B) an organopolysiloxane having $R^1_3SiO_{0.5}$ units and $SiO_2$ units, wherein $R^1$ is a substituted or unsubstituted, monovalent hydrocarbon group having 1 to 10 carbon atoms, and wherein a ratio of the number of the $R^1_3SiO_{0.5}$ units to the number of the $SiO_2$ units is 0.6 to 1.7,
(C) an organohydrogenpolysiloxane having at least three SiH groups,
(D) optionally an addition reaction inhibitor,
(E) a platinum group metal catalyst for an addition reaction, and
(F) an organic solvent, and
the peroxide curable silicone adhesive composition comprises
(A2) a diorganopolysiloxane having a viscosity at 25° C. of 100,000 mPa·s or more and may or may not have an alkenyl group,
(B) an organopolysiloxane having $R^1_3SiO_{0.5}$ units and $SiO_2$ units, wherein $R^1$ is a substituted or unsubstituted, monovalent hydrocarbon group having 1 to 10 carbon atom, and wherein a ratio of the number of the $R^1_3SiO_{0.5}$ units to the number of the $SiO_2$ units is 0.6 to 1.7,
(F) an organic solvent, and
(G) an organic peroxide,
and components (A1) and (A2) may be accompanied with octamethylcyclotetrasiloxane and/or decamethylcyclopentasiloxane and each content of octamethylcyclotetrasiloxane and decamethylcyclopentasiloxane is less than 0.1 mass %, based on a total amount of component (A1) or (A2), component (B) and octamethylcyclotetrasiloxane and decamethylcyclopentasiloxane.

2. The silicone adhesive composition according to claim 1, wherein components (A1) and (A2) are one or more of the compounds represented by the following formula (1), (2) or (3):

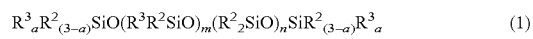

$$R^3_a R^2_{(3-a)}SiO(R^3R^2SiO)_m(R^2_2SiO)_nSiR^2_{(3-a)}R^3_a \quad (1)$$

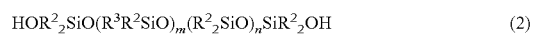

$$HOR^2_2SiO(R^3R^2SiO)_m(R^2_2SiO)_nSiR^2_2OH \quad (2)$$

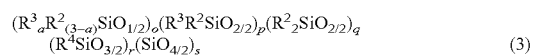

$$(R^3_a R^2_{(3-a)}SiO_{1/2})_o(R^3R^2SiO_{2/2})_p(R^2_2SiO_{2/2})_q$$
$$(R^4SiO_{3/2})_r(SiO_{4/2})_s \quad (3)$$

wherein $R^2$ is, independently of each other, a substituted or unsubstituted, monovalent hydrocarbon group having no aliphatic unsaturated bond, $R^3$ is, independently of each other, a monovalent organic group having an alkenyl group, a is an integer of from 0 to 3, m is an integer of 0 or more, n is an integer of 100 or more, a total of m and n is such that the viscosity of the diorganopolysiloxanes at 25° C. is 100,000 mPa·s or more, $R^4$ is, independently of each other, selected from the groups defined for $R^2$ and $R^3$, o is an integer of from 3 to 12, p is a integer of 0 or more, q is an integer of 100 or more, a total of r and s is an integer of from 1 to 5, a total of o, p, q, r, and s is such that the viscosity of the diorganopolysiloxane at 25° C. is 100,000 mPa·s or more, provided that for component (A1), m in formula (1) is 2 or more when a is 0; and m in formula (2) is 2 or more; and p in formula (3) is 2 or more when a is 0.

3. The silicone adhesive composition according to claim 1, wherein
the addition curable silicone adhesive composition comprises
component (A1) in an amount of 99 to 25 parts by mass,
component (B) in an amount of 1 to 75 parts by mass, provided that a total amount of
components (A1) and (B) is 100 parts by mass,
component (C) in an amount such that a ratio of the number of SiH groups in component (C) to the number of the alkenyl groups in components (A1) and (B) is 0.5 to 20,
component (D) in an amount of 0 to 8.0 parts by mass, relative to a total 100 parts by mass of components (A1) and (B),
component (E) in an amount such that an amount of the platinum group metal is 5 to 2,000 ppm, based on a total amount of components (A1) and (B), and
component (F) in an amount of 25 to 900 parts by mass, relative to a total 100 parts by mass of components (A1) and (B), and
the peroxide curable silicone adhesive composition comprises
component (A2) in an amount of 99 to 25 part by mass,
component (B) in an amount of 1 to 75 parts by mass, provided that a total amount of
components (A2) and (B) is 100 parts by mass,
component (F) in an amount of 25 to 900 parts by mass, relative to a total 100 parts by mass of components (A2) and (B), and
component (G) in an effective amount to cure components (A2) and (B).

4. The silicone adhesive composition according to claim 1, wherein each content of octamethylcyclotetrasiloxane and decamethylcyclopentasiloxane is less than 0.1 mass %, based on a total amount of component (A1) or (A2), octamethylcyclotetrasiloxane and decamethylcyclopentasiloxane.

5. An adhesive film having a substrate, wherein at least one surface of the substrate has a layer obtained by curing the silicone adhesive composition according to claim 1.

6. An adhesive tape having a substrate, wherein at least one surface of the substrate has a layer obtained by curing the silicone adhesive composition according to claim 1.

* * * * *